United States Patent [19]

Hein et al.

[11] 4,018,212

[45] Apr. 19, 1977

[54] SOLAR HEATING AND COOKING APPARATUS

[76] Inventors: Leopold A. Hein, Rte. 7, Fayetteville, Tenn. 37334; William N. Myers, 4306B Boxwood Court, Huntsville, Ala. 35805

[22] Filed: Feb. 13, 1976

[21] Appl. No.: 657,820

[52] U.S. Cl. .............................. 126/270; 126/271
[51] Int. Cl.² ............................................ F24J 3/02
[58] Field of Search ............ 126/270, 271; 237/1 A

[56] References Cited

UNITED STATES PATENTS

| 1,081,098 | 12/1913 | Garza | 126/270 |
| 3,236,227 | 2/1966 | Steinberg | 126/270 |
| 3,938,497 | 2/1976 | Andrassy | 126/270 |
| 3,970,070 | 6/1976 | Meyer et al. | 126/271 |

Primary Examiner—Kenneth W. Sprague
Attorney, Agent, or Firm—L. D. Wooford, Jr.; George J. Porter; John R. Manning

[57] ABSTRACT

This invention relates to a solar appliance apparatus for utilizing solar thermal radiation to supply heat to a heating and cooking surface. The apparatus includes a housing permanently stationed inside a residential structure and the like. The housing contains a heat transfer medium and a radiation receiver carried in heat exchange contact with the medium. A heating and cooking surface is carried by the housing in heat exchange relationship with the heat transfer medium. A radiation pipe extends through the exterior wall of the building structure to deliver a concentrated beam of solar radiation rays to the radiation receiver.

19 Claims, 4 Drawing Figures

SOLAR HEATING AND COOKING APPARATUS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Much attention has been given lately to the problems and advantages in utilizing solar energy for various heating purposes. While the utilization of solar energy for heating purposes appears to be attractive, providing solar appliances which efficiently utilize solar energy is a problem to which considerable attention must be given.

Heretofore, devices have been provided for utilizing solar energy to provide a source of heat for various solar applicances such as shown in U.S. Pat. No. 1,081,098 and 3,391,688. However, these devices are not very practical for ordinary cooking operations such as in the home.

SUMMARY OF THE INVENTION

A solar heating and cooking apparatus is provided comprising a housing and a heat transfer medium carried within the housing for storing and transferring thermal energy. A cone member is carried by the housing for receiving and absorbing solar thermal radiation. The cone member is tapered inwardly into the heat transfer medium and terminates in an apex portion surrounded by the medium in heat exchange contact therewith. Lens means is provided for receiving and focusing a concentrated beam of solar radiation rays upon the cone member. A heat conductive surface is carried by the housing in heat exchange relationship with the heat transfer medium for heating and cooking. A control means is provided for regulating the heat transferred to the heat conductive surface to control the temperature of the surface. Thus, solar energy received by the cone member is effectively transferred to the heat conductive surface for heating and cooking.

Accordingly, an important object of the present invention is to provide apparatus for efficiently utilizing solar energy in heating and cooking.

Another important object of the present invention is to provide an efficient solar heating and cooking apparatus for stationary installation within a residential building structure for heating and cooking operations.

Still another important object of the present invention is to provide a solar heating and cooking apparatus having a highly efficient solar radiation receiver for absorbing solar radiation and for transferring the absorbed thermal energy to a heat transfer medium carried within the apparatus.

Another important object of the present invention is to provide solar heating and cooking apparatus having a lens system for accurately focusing a concentrated beam of solar energy to conform substantially to a surface of a radiation receiver for efficient absorption of solar radiation.

Another important object of the present invention is to provide a solar heating and cooking apparatus wherein the temperature of the heating and cooking surfaces may be regulated to a desired temperature.

Still another important object of the present invention is to provide a solar heating and cooking apparatus having a heating and cooking surface which is both readily accessible and convenient to use in cooking operations.

Still another important object of the present invention is to provide an efficient solar heating and cooking apparatus installed within a residential building structure wherein a radiation pipe may be installed through an exterior wall of the building to deliver a concentrated beam of solar radiation to the solar apparatus.

These and other objects and advantages of the present invention will become apparent upon reference to the following specification, attendant claims and drawings.

DESCRIPTION OF A PREFERRED EMBODIMENT

Figure 1:
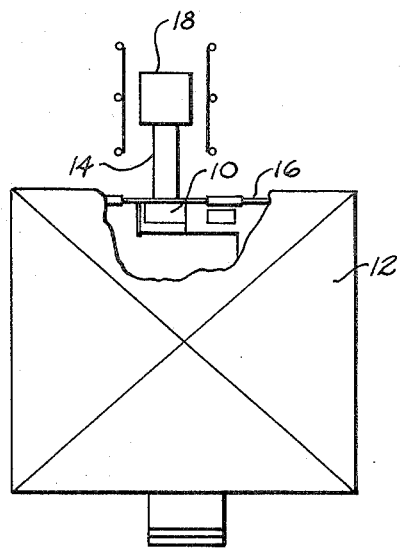
FIG. 1 is a top plan view of a building structure with a solar heating and cooking apparatus installed within the interior thereof as constructed in accordance with the present invention.

The apparatus of the present invention relates to solar heating and cooking apparatus and, more particularly, to a solar heating and cooking apparatus 10 which is installed stationarily within a residential building structure 12. A light pipe 14 passes through an exterior wall 16 of the residential building 12. A solar energy collector 18 may be provided for collectig solar rays from the sun and for concentrating the solar rays into a concentrated beam of solar radiation rays which is then delivered through the radiation pipe 14 to the solar heating and cooking apparatus 10. Although the solar cooking and heating apparatus 10 is illustrated as being installed in a residental dwelling, other applications are also contemplated.

The solar collector and concentrating apparatus 18 is preferably of the type disclosed in applicants' co-pending U.S. Pat. application Ser. No. 653,872 filed on Jan. 30, 1976 entitled APPARATUS FOR CONCENTRATING SOLAR ENERGY. Such apparatus provides a concentrated beam of solar radiation having a fixed orientation while the collector apparatus adjusts in position to compensate for changes in the sun's position.

Figure 2:
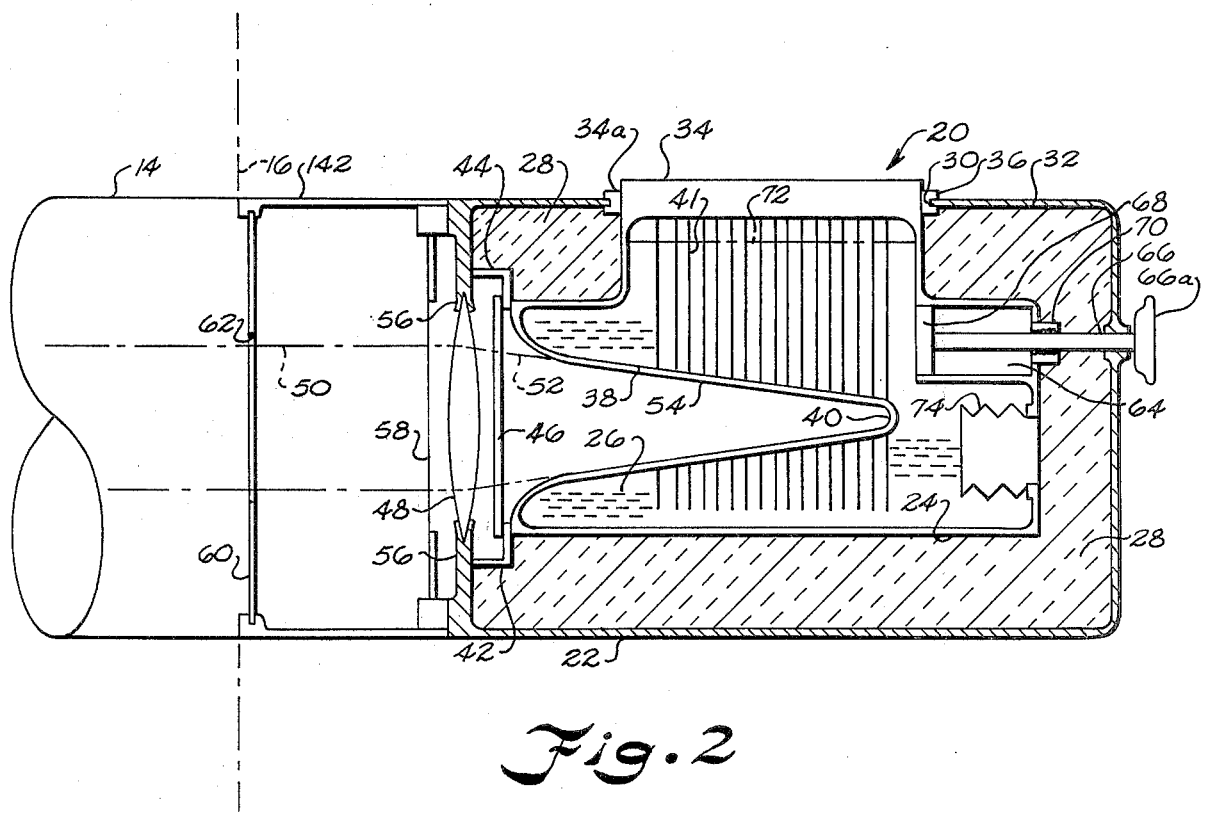
FIG. 2 is a side elevational cut-way view illustrating a solar heating and cooking apparatus constructed in accordance with the present invention.

Referring now to FIG. 2 of the drawings, a solar heating and cooking apparatus, designated generally at 20, is shown in more detail. The apparatus includes a housing 22 constructed of a low heat conductive metal such as steel and an inner metallic shell 24. This inner shell 24 is formed from a suitable metal such as copper or aluminum having a relatively high heat conductance. A heat transfer medium 26 is carried within the inner shell 24 for storing and transferring thermal energy therein. The heat transfer medium 26 may be liquids having high boiling points, a eutectic material, or a fusible salt having a high melting point. A suitable high boiling point liquid would be fish oil. It is to be understood, of course, that other suitable heat transfer media may also be utilized. Insulating material 28 is placed in the space between the outer housing shell 22 and the inner shell 24 to reduce the loss of heat from within the metallic shell 24 to outside of the housing.

An opening 30 is formed in an upper surface 32 of the housing 22. A heating and cooking surface 34 formed integral with the inner metallic shell 24 and having high heat conductivity extends through the opening and is coextensive therewith. The heat conductive surface 34 provides a heating and cooking surface having convenient access for cooking operations. An insulating ring 36 is fitted between the edge of the opening 30 and the side wall of the raised heating and cooking surface 34. The surface 34 is spaced above the level of the heat transfer medium 26 in heat exchange relationship therewith.

A radiation receiver is provided by a cone member 38 carried integrally at one end of the inner shell 24. The cone member receives and absorbs thermal solar radiation coming from the outside solar collector 18. The cone member 38 is tapered inwardly into the interior of the metal shell 24 and into the heat transfer medium 26 in heat exchage contact therewith. The cone member 38 terminates in an apex portion 40 which is surrounded by the heat transfer medium, as is substantially the entire length of the cone member. A plurality of heat conductive fins 41 are carried in heat exchange contact with the cone 38 and the heat transfer medium 26. The fins 41 extend upwardly to adjacent the bottom surface of the heated surface 34 aiding in the transfer of heat thereto.

The cone member 38, the heating and cooking surface 34 and the inner metallic shell 24 may be constructed as a one-piece unit or the individual components may be fastened together in an integral manner such as by welding and like. The structure so formed is preferably constructed of a high heat conductive metal such as copper or aluminum. The inner shell 24 may be mounted and secured within the housing 22 by any suitable means such as by L-shaped bracket members 42 and 44. The bracket members 42 and 44 may be fastened between the inner shell 24 and the outer housing 22 in any suitable manner such as by welding.

A plate of heat-proof glass 46 is carried by the bracket members 42 and 44 adjacent the open end of the cone member 38 to prevent the heat absorbed within the cone member 38 from being lost from the housing 22. Adjacent the glass plate 46 is a final focusing lens 48 providing a lens means for receiving a concentrated beam 50 of solar radiation rays and focusing the beam upon the cone member 38.

The lens 48 is preferably a condenser lens which condenses the light beam 50 into a cone-shaped beam 52 for direct focusing upon the interior 54 of the cone member 38. The shape of beam 52 conforms substantially to the interior receiving surface of the cone 38. Thus, the cone member will be heated to the highest temperature at the apex portion 40 extended into the heat transfer medium 26. The interior surface 54 may be coated with a highly absorptive coating having a low emissitivity factor. A suitable condenser lens means 48 is a convex lens or a bi-convex lens. The lens 48 is carried by a pair of support members 56 which are carried integral with the housing 22. The lens 48 is carried in focusing alignment with the concentrated beam 50 and the cone member 38.

An optical iris 58 is carried adjacent the focusing lens 48. The iris 58 is preferably manually adjustable so as to adjust the amount of solar light rays impinging upon the focusing lens 48. The optical iris 58 is preferably a conventional type such as in a photographic apparatus that may be manually adjusted.

An etched glass or metal plate 60 is provided at the junction of the radiation pipe 14 and the exterior wall 16 of the building structure in which the solar apparatus is installed. The plate 60 has an opening 62 formed therein through which the concentrated beam 50 is allowed to pass for supplying thermal energy to the solar apparatus 20.

In order to regulate the temperature of the heating and cooking surface 34, a cylinder chamber 64 is formed within the inner shell 24. A threadable stem member 66 extends through the housing 22 and inner shell 24 and has an enlarged piston head 68 carried on the end thereof. The stem 66 is threadably received in a threaded flange member 70 carried by inner shell 24. The piston head 68 is slideably received in the cylinder chamber 64 for varying the volume of the chamber 64. As the volume of the cylindrical chamber 64 is varied the level 72 of the heat transfer medium within the inner shell 24 will change accordingly. As the level 72 of the medium is raised closer to the heating and cooking surface 34, the temperature of the surface 34 will be increased. Conversely, as the level 72 is lowered, the temperature of the heating and cooking surface 34 will be reduced. Thus, by varying the volume of the cylindrical chamber 64 the level of the heat transfer medium in the shell 24 will be varied relative to the heat conductive surface 34 to control the temperature thereof.

An expansion means is provided by bellows member 74 carried by an interior surface of the inner shell 24. The bellows 74 extends into the interior of the shell 24 to accommodate the expansion and contraction of heat transfer medium 26 due to changes in the amount of heat being absorbed by the medium.

Figure 3:
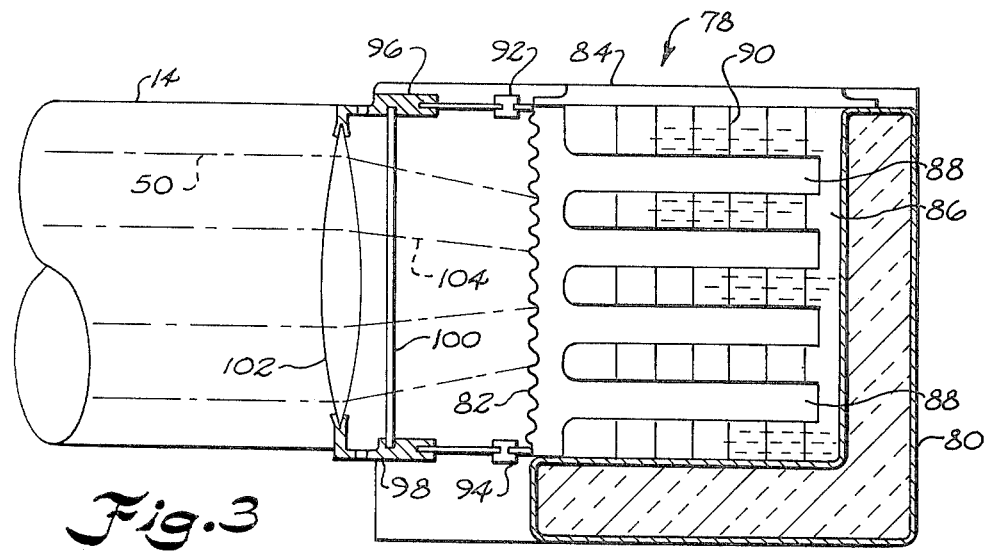
FIG. 3 is a side elevational cut-away view illustrating another embodiment of a solar heating and cooking apparatus constructed in accordance with the present invention.

Referring now to FIG. 3, an alternate embodiment of a solar heating and cooking apparatus is illustrated generally at 78. The apparatus is contained within a housing 80. A radiation receiver is provided by a plate member 82 which may be a smooth coated plate or a plate with irregular surface carried by the housing 80 to increase the radiated area and absorption. The radiation receiver 82 may be mounted or secured to the housing 80 in any suitable manner or may be made as one piece. A heating and cooking surface 84 is carried by the housing member 80 extending across the plate member 82 and the housing 80.

A heat transfer medium 86 is contained within an inner shell defined by the housing 80, the plate member 82, and the heating and cooking surface 84. A plurality of heat transfer rods 88 formed integral with the radiation receiving plate 82 extend into the heat transfer medium 86. As solar thermal radiation is received by the plate member 82, the thermal energy is transferred to the heat transfer medium 86 by way of the heat transfer rods 88. Heat conductive fins 90 are provided for aiding in the transfer of heat to the heating and cooking surface 84.

A pair of insulating spacing members 92 and 94 connect the plate member 82 to upper and lower bracket members 96 and 98, respectively. The bracket members 96 and 98 are provided by the housing 80 and may be secured thereto such as by welding. The upper and lower brackets 96 and 98 further provide support for a plate 100 of heat-proof glass which prevents heat loss outwardly from the corrugated plate member 82.

The brackets 96 and 98 also carry and support an optical lens 102 for focusing the concentrated beam 50 of solar radiation rays upon the radiation receiving plate 82. The optical lens 102 may be a conventional condenser lens such as shown at 48 of FIG. 2. The lens 102 condenses the concentrated beam 50 into a beam of converging rays 104 which impinge on the plate 82.

The plate 82 reduces the need for accurate focusing of the beam 50 by the focusing lens 102 as is needed for the cone radiation receiving member 38 of FIG. 2. This is so because in the embodiment of FIG. 2 the beam 50 must be focused and condensed in the form of a cone-shaped beam 52 to hit upon the radiation receiver. However, the use of a receiving member such as at 82 provides a larger surface area over which the beam may be focused. The irregularities in the plate 82 increase the surface area and compensate if any of the rays of beam 104 do not come in at a right angle to the surface 82.

The plate member 82, the heat transfer rods 88, and the heat and conducting surface 84 may be made from any suitable metal having a high conductance such as aluminum or copper.

Figure 4:
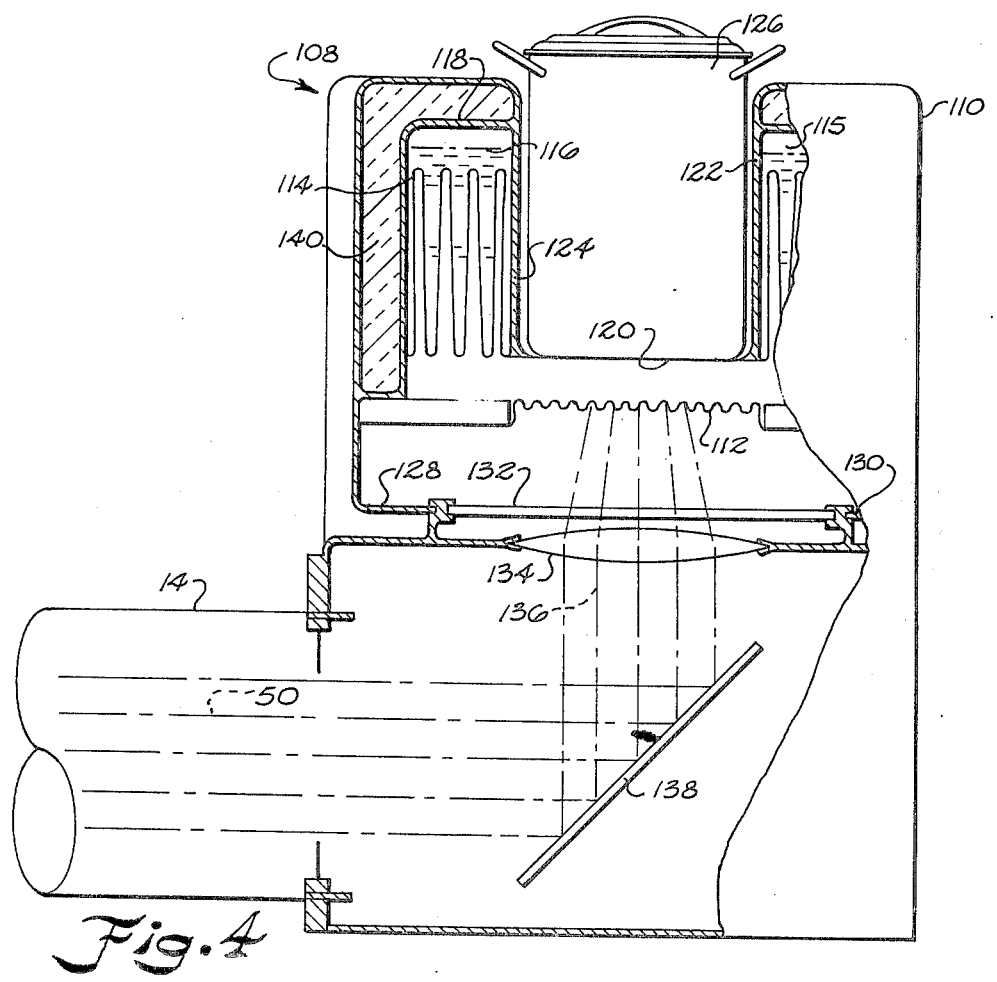
FIG. 4 is a side elevational cut-away view illustrating another embodiment of a solar heating and cooking apparatus constructed in accordance with the present invention.

FIG. 4 illustrates another embodiment of a solar heating and cooking apparatus, shown generally at 108, having a housing 110. A radiation receiver is provided by a plate member 112. Integral with the plate 112 are a plurality of heat transfer concentric ribs 114 which extend upwardly into a space 115 in which a heat transfer medium 116 is contained. The housing 110 further includes an inner shell 118 which provides an enclosure for containing the heat transfer medium 116 in conjunction with the boundary of the heat transfer concentric ribs 114. The housing further includes a recessed cooking surface defined by a bottom surface 120 and a pair of opposed side walls 122 and 124 extending upwardly and integral with bottom surface 120. A cooking vessel 126 may be received in the recessed surface for cooking. The heat transfer concentric ribs 114 and the plate 112 may be made integral such as by welding or may be made as one piece.

A pair of lower bracket members 128 and 130 are provided by the housing 110 for supporting a plate 132 of heat-proof glass which prevents loss of heat from the radiation receiving plate 112. The lower brackets 128 and 130 further provide support for a focusing lens 134 which focuses a concentrated beam 136 of solar radiation rays onto the radiation receiving plate 112. The lens 134 may be a conventional convex or fresnel lens.

Since the surface of the radiation receiving plate 112 is at right angles to the concentrated beam 50 coming from the solar collecting and concentrating apparatus 18, it is necessary to provide a re-directing mirror member 138. The mirror 138 reflects the beam 50 through approximately ninety degrees to provide the redirected beam 136 for striking the plate 112.

As in the other embodiments, insulating material 140 may be provided in the space between the outer walls of the housing 110 and the inner shell wall 118 for reducing heat loss. As an alternative to conventional insulation, the space between the walls may be evacuated and filled with reflective foil.

FIGS. 3 and 4 do not illustrate a control means for regulating the temperature of the heating and cooking surfaces 84 and 120, respectively. It is to be understood, however, that temperature control is to be provided for the cooking surfaces in the same manner as disclosed and illustrated in the embodiment of FIG. 2. Expansion means such as bellow member 74 shown in FIG. 2 may also be provided in the heat transfer medium reservoirs of FIGS. 3 and 4 to accommodate the expansion and contraction of the heat transfer media.

It is also noted in FIG. 2, that a window plate 142 may be provided between the solar apparatus 20 and the building structure wall 16. The window allows observation of the correct location of the beam 50 passing through the plate 60 so that corrections can be made to tracking errors, tracking malfunctions, or other errors in the concentrating of the beam 50 through the opening 62.

Thus, an advantageous construction of a solar heating and cooking apparatus can be had in accordance with the present invention for utilization in a stationary installation within residential building structures and the like. A solar heating and cooking apparatus provides efficient use of solar energy to provide a convenient heating and cooking surface in the home such as in the kitchen. The particular cone-shaped radiation receiver 38 and the focusing of the concentrated solar radiation beam 50 upon the cone member provide maximum heat transfer to the heat transfer medium contained within the inner shell.

While a preferred embodiment of the invention has been described using specific terms, such description is for illustrative purposes only, and it is to be understood that changes and variations may be made without departing from the spirit or scope of the following claims.

What is claimed is:

1. A solar heating and cooking apparatus comprising:
   a. a housing;
   b. a heat transfer medium carried within said housing for storing and transferring thermal energy;
   c. a cone member carried by said housing for receiving and absorbing solar thermal radiation; said cone member being tapered inwardly into said heat transfer medium and terminating in an apex portion surrounded by said medium in heat exchange contact therewith;
   d. lens means for receiving and focusing a concentrated beam of solar radiation rays upon said cone member;
   e. a heat conductive surface carried by said housing in heat exchange relationship with said heat transfer medium for heating and cooking;
   f. Control means for regulating said heat transferred to said heat conductive surface to control the temperature of said surface:
   whereby solar energy received by said cone member is effectively transferred to said heat conductive surface for heating and cooking.

2. The apparatus set forth in claim 1 wherein said heat transfer medium is a liquid having a high boiling point.

3. The apparatus set forth in claim 1 wherein said heat transfer medium is a fusible salt.

4. The apparatus set forth in claim 1 wherein said housing includes an inner metallic shell containing said heat transfer medium and wherein said cone member extends into said inner shell.

5. The apparatus of claim 4 wherein said housing includes an opening formed in an upper surface thereof, said heat conductive surface being carried by said housing co-extensive with said opening.

6. The apparatus set forth in claim 1 wherein said lens means includes a condenser lens which condenses the concentrated beam into a cone-shaped beam of solar rays for impingement upon said cone member.

7. The apparatus set forth in claim 1 wherein said control means for regulating the temperature of said heat conductive surface comprises:
 a. a cylinder chamber formed within said housing;
 b. an adjustable piston member slideably received in said cylinder chamber for varying the volume of said chamber;
 whereby varying the volume of said cylindrical chamber changes the level of the heat transfer medium in the housing to raise and lower the level of the medium relative to the heat conductive surface to thereby control the temperature thereof.

8. The apparatus as set forth in claim 4 wherein said inner shell includes a bellows member extending into the interior thereof for accommodating the expansion of said heat transfer medium due to the increase of heat being absorbed thereby.

9. The apparatus set forth in claim 1 wherein said apparatus further comprises an adjustable optical iris carried adjacent said lens means to adjust the amount of solar rays received by said lens means.

10. A solar heating and cooking apparatus comprising:
 a. a housing;
 b. a heat transfer medium carried within said housing;
 c. a radiation receiver carried by said housing in heat exchange contact with said heat transfer medium;
 d. lens means for receiving and focusing a concentrated beam of solar radiation rays upon said radiation receiver;
 e. a heat conductive surface carried by said housing in heat exchange relationship with said heat transfer medium for heating and cooking; and
 f. control means for regulating the temperature of said heat conductive surface by regulating the distance between the level of said heat transfer medium and said heat conductive surface;
 whereby solar energy impinging on said radiation receiver is effectively utilized to heat said heating and cooking surface.

11. The apparatus set forth in claim 10 wherein said radiation receiver includes a cone member tapered inwardly into said heat transfer medium terminating in an apex portion surrounded by said medium.

12. The apparatus set forth in claim 10 wherein said radiation receiver includes a plate member to compensate for radiation losses due to inaccuracies in focusing said concentrated beam upon said radiation receiving means.

13. The apparatus set forth in claim 12 wherein said radiation receiver further includes a plurality of heat transfer rods integral with said plate member extending into and surrounded by said heat transfer medium.

14. The apparatus set forth in claim 10 wherein said control means comprises:
 a. cylindrical chamber formed within said housing;
 b. an adjustable piston member slideably carried within said cylindrical chamber; and
 c. said adjustable piston member being slideably adjusted in said cylindrical chamber so as to vary the volume thereof;
 whereby varying the volume of said cylindrical chamber adjusts the level of said heat transfer medium to vary the distance between the level of the heat transfer medium and said heat conductive surface so as to control the temperature of said heat conductive surface.

15. The apparatus set forth in claim 11 wherein said cone member is heated to a higher temperature at said apex portion.

16. The apparatus set forth in claim 10 wherein said heat conductive surface is defined by a bottom surface and a pair of spaced opposed sidewalls extending upwardly therefrom providing a recessed surface for receiving a cooking vessel therein.

17. The apparatus set forth in claim 10 wherein said radiation receiver includes a plurality of integral heat transfer concentric ribs extending into said heat transfer medium.

18. The apparatus set forth in claim 10 further comprising an adjustable optical iris carried adjacent said lens means to adjust the amount of solar rays received by said lens means.

19. The apparatus set forth in claim 10 further comprising expansion means carried by said housing to accommodate the expansion of said heat transfer medium as it absorbs thermal energy from said radiation receiver.

* * * * *